(12) United States Patent
Jang et al.

(10) Patent No.: US 12,351,168 B2
(45) Date of Patent: Jul. 8, 2025

(54) VEHICLE FOR PERFORMING MINIMAL RISK MANEUVER AND METHOD FOR OPERATING THE VEHICLE

(71) Applicants: Hyundai Motor Company, Seoul (KR); Kia Corporation, Seoul (KR); Ajou University Industry-Academic Cooperation Foundation, Suwon-si (KR)

(72) Inventors: Chan Jong Jang, Daegu (KR); Young Bin Min, Busan (KR); Cheol Hwan Yun, Seoul (KR); Jong Sung Park, Hwaseong-si (KR); Bong Sob Song, Seongnam-si (KR); Ji Min Lee, Hwaseong-si (KR); Sung Woo Lee, Hwaseong-si (KR)

(73) Assignees: Hyundai Motor Company, Seoul (KR); Kia Corporation, Seoul (KR); Ajou University Industry-Academic Cooperation Foundation, Suwon-si (KR)

( * ) Notice: Subject to any disclaimer, the term of this patent is extended or adjusted under 35 U.S.C. 154(b) by 238 days.

(21) Appl. No.: 18/333,840

(22) Filed: Jun. 13, 2023

(65) Prior Publication Data
US 2023/0406295 A1    Dec. 21, 2023

(30) Foreign Application Priority Data
Jun. 16, 2022  (KR) .......................... 10-2022-0073493

(51) Int. Cl.
*B60W 30/09* (2012.01)
*B60W 30/095* (2012.01)
*B60W 60/00* (2020.01)

(52) U.S. Cl.
CPC ........ *B60W 30/09* (2013.01); *B60W 30/0956* (2013.01); *B60W 60/0015* (2020.02); *B60W 2554/4041* (2020.02)

(58) Field of Classification Search
CPC ............. B60W 30/09; B60W 30/0956; B60W 60/0015; B60W 2554/4041
See application file for complete search history.

(56) References Cited

U.S. PATENT DOCUMENTS 10,152,056 B2    12/2018  Rohde et al.
2017/0108865 A1*  4/2017  Rohde ................. B60W 60/007
(Continued)

FOREIGN PATENT DOCUMENTS

DE    102015220360 A1    4/2017
EP         2657921 A1 * 10/2013   ........... B60K 28/063
(Continued)

OTHER PUBLICATIONS

Machine Translation of Bartels's reference (EP-2657921-A1) (Year: 2013).*

*Primary Examiner* — Tarek Elarabi
(74) *Attorney, Agent, or Firm* — Slater Matsil, LLP

(57) ABSTRACT

An embodiment method for operating a vehicle includes monitoring a state of the vehicle, determining a type of an emergency stop from a plurality of types of emergency stops based on the state of the vehicle, and executing the determined type of the emergency stop. An embodiment vehicle includes sensors, a processor configured to control automated driving of the vehicle based on state information of components of the vehicle and surrounding environment information of the vehicle detected by the sensors, and a controller configured to control an operation of the vehicle based on a control of the processor, wherein the processor is further configured to monitor a state of the vehicle, determine a type of an emergency stop from a plurality of types (Continued)

of emergency stops based on the state of the vehicle, and execute the determined type of the emergency stop by controlling the controller.

24 Claims, 11 Drawing Sheets

(56) References Cited

U.S. PATENT DOCUMENTS

| | | | | |
|---|---|---|---|---|
| 2017/0322558 | A1* | 11/2017 | Teshima | ................. H04L 67/00 |
| 2020/0331493 | A1* | 10/2020 | Wu | ..................... B60W 50/023 |
| 2021/0201145 | A1 | 7/2021 | Pham et al. | |
| 2022/0171977 | A1 | 6/2022 | Oh | |
| 2023/0382371 | A1 | 11/2023 | Park et al. | |

FOREIGN PATENT DOCUMENTS

| | | | | | |
|---|---|---|---|---|---|
| EP | | 4052982 | A1 * | 9/2022 | ............. B60K 28/06 |
| EP | | 4155149 | A2 * | 3/2023 | ............. B60W 30/09 |
| EP | | 4155152 | A2 * | 3/2023 | ............. B60K 28/14 |
| WO | | 2022092684 | A1 | 5/2022 | |

* cited by examiner

VEHICLE FOR PERFORMING MINIMAL RISK MANEUVER AND METHOD FOR OPERATING THE VEHICLE

CROSS-REFERENCE TO RELATED APPLICATIONS

This application claims the benefit of Korean Patent Application No. 10-2022-0073493, filed on Jun. 16, 2022, which application is hereby incorporated herein by reference.

TECHNICAL FIELD

Various embodiments relate to a vehicle for performing a minimal risk maneuver and a method for operating the vehicle.

BACKGROUND

Recently, advanced driver assistance systems (ADAS) have been developed to assist drivers in driving. ADAS has multiple sub-technology classifications and can provide significant convenience to a driver. Such ADAS are also called an autonomous driving or ADS (Automated Driving System).

On the other hand, when the vehicle performs the automated drive, an unexpected accident or event may occur, and the vehicle may be in a dangerous state if an appropriate response to minimize the risk of a collision with a neighboring vehicle is not performed for such an event.

SUMMARY

Various embodiments relate to a vehicle for performing a minimal risk maneuver and a method for operating the vehicle. Particular embodiments relate to a vehicle for determining a type of an emergency stop to minimize risk of a collision with a neighboring vehicle and performing a minimal risk maneuver accordingly when an unexpected accident or event occurs while driving on a highway and a method for operating the vehicle.

Various embodiments of the present disclosure may provide a method for determining an emergency stop type to minimize a risk of a collision with a neighboring vehicle in response to an event that occurs during an automated drive of a vehicle.

Technical problems solvable by embodiments of the present disclosure are not limited to what are mentioned above, and other technical problems not mentioned above may be precisely understood by those skilled in the art from the description provided below.

According to various embodiments of the present disclosure, one embodiment is a method for operating a vehicle including monitoring a state of a vehicle, determining a type of an emergency stop based on the state of the vehicle, and executing the determined type of the emergency stop.

According to various embodiments of the present disclosure, a vehicle may include a sensor for detecting the state information of the components of the vehicle and the surrounding environment information of the vehicle, a processor for controlling automated driving of the vehicle based on information coming from the sensor, and a controller for controlling operation of the vehicle according to control of the processor.

The processor may monitor a status of the vehicle based on information coming from the sensor, determine a type of an emergency stop based on the status of the vehicle, and execute the determined type of the emergency stop by controlling the controller.

According to various embodiments of the present disclosure, the method for operating a vehicle may further include obtaining a request to execute a minimal risk maneuver function, and only when the request is obtained, the monitoring, the determining the type of the emergency stop, and the executing the determined type of the emergency stop may be performed.

According to various embodiments of the present disclosure, the method for operating a vehicle may further include determining whether the vehicle has completed the executing the type of the emergency stop and has reached a minimal risk state or not and turning off an automated drive system when the vehicle reaches the minimal risk state.

According to various embodiments of the present disclosure, the monitoring the state of the vehicle may include obtaining state information of components of the vehicle and obtaining surrounding environment information of the vehicle.

According to various embodiments of the present disclosure, the type of the emergency stop may include straight-ahead stopping, which stops after driving straight ahead only, in-lane stopping, which stops while driving along a lane, half-shoulder stopping, which stops across a shoulder after recognizing a shoulder, and full-shoulder stopping, which completely turns to a shoulder and stops on a shoulder after recognizing a shoulder.

According to various embodiments of the present disclosure, the determining the type of the emergency stop based on the state of the vehicle may include determining the straight-ahead stopping when control of a brake of the vehicle is only available, determining the in-lane stopping when control of a brake and control of steering of the vehicle is available, and determining one among the half-shoulder stopping or the full-shoulder stopping when control of a brake and control of steering of the vehicle is available and a lane change and shoulder detection is available.

According to various embodiments of the present disclosure, the determining the type of the emergency stop based on the state of the vehicle may include generating an image including at least a part of the state information of the components of the vehicle and the surrounding environment information of the vehicle and determining a type of an emergency stop using artificial intelligence that takes the generated image as an input.

According to various embodiments of the present disclosure, the generating an image may include generating a first image including driving function information of the vehicle, generating a second image including detection function information of the vehicle, generating a third image including information on the surrounding environment of the vehicle, and generating a simplified bird's eye view image by synthesizing the generated first image to third image.

According to various embodiments of the present disclosure, the generating the first image including driving function information of the vehicle may include generating the first image that displays a drivable area and a non-drivable area in different colors based on a current steering angle of the vehicle when controlling a steering angle of the vehicle is impossible.

According to various embodiments of the present disclosure, the generating a second image including detection function information of the vehicle may include generating the second image that displays a lane and a shoulder in different colors.

According to various embodiments of the present disclosure, the generating a second image including detection function information of the vehicle may include predicting current lane information based on normally recognized lane information of a past and generating the second image that displays the normally detected lane information and the predicted lane information in a way to be distinguished from each other when lane detection fails.

According to various embodiments of the present disclosure, the processor may calculate a risk of a collision with a neighboring vehicle and change and display brightness of the neighboring vehicle included in the simplified bird's eye view image according to the collision risk to include the collision risk.

According to various embodiments of the present disclosure, even if a vehicle is endangered by an event that occurs during an automated drive, the vehicle may execute a minimal risk maneuver capable of eliminating the risk. Accordingly, the vehicle may escape from the risk and get into a minimal risk state, and driving stability of the vehicle may be further improved.

Advantageous effects that may be obtained from embodiments of the present disclosure are not limited to what are mentioned above, and other advantageous effects not mentioned may be precisely understood by those skilled in the art from the following description.

BRIEF DESCRIPTION OF THE DRAWINGS

The same reference numerals may be used to denote the same or substantially the same elements regarding description of the drawings.

DETAILED DESCRIPTION OF ILLUSTRATIVE EMBODIMENTS

Hereinafter, various embodiments of the present disclosure will be described in further detail with reference to the accompanying drawings.

When a plurality of embodiments are explained in the present disclosure, each of the embodiments may be independent, and two or more embodiments may be combined and used unless they conflict with each other.

Figure 1:
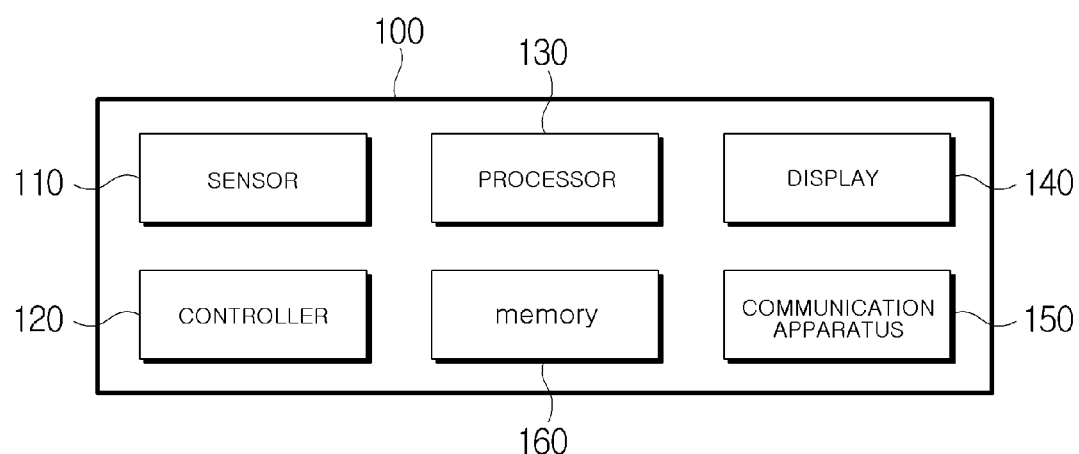
FIG. 1 shows a conceptual structure of a vehicle according to various embodiments of the present disclosure.

FIG. 1 shows a conceptual structure of a vehicle according to various embodiments of the present disclosure.

Referring to FIG. 1, a vehicle 100 may support an automated drive. According to embodiments, the vehicle 100 may perform steering, acceleration, braking, shifting, or parking without a driver's manipulation, and may drive under the driver's control when the driver intervenes. For example, the vehicle 100 may mean a vehicle capable of performing an automated drive according to a level 3 or higher according to the Society of Automation Engineers (SAE), but the present disclosure is not limited thereto.

For example, the automated drive explained in embodiments of the present disclosure may include at least one ADS function selected among pedestrian detection and collision mitigation system (PDCMS), lane change decision aid system (LCDAS), lane departure warning system (LDWS), adaptive cruise control (ACC), lane keeping assistance system (LKAS), road boundary departure prevention system (RBDPS), curve speed warning system (CSWS), forward vehicle collision warning system (FVCWS), low speed following (LSF), and the like.

The vehicle 100 may include a sensor 110, a controller 120, a processor 130, a display 140, a communication apparatus 150, and a memory (i.e., a storage device) 160.

The sensor 110 may sense an environment around the vehicle 100 and generate data related to the surroundings of the vehicle 100. According to embodiments, the sensor 110 may include at least one selected among a camera, a light detection and ranging (LIDAR) sensor, a radio detection and ranging (RADAR) sensor, and a location sensor.

The camera may photograph the surroundings of the vehicle 100 and may generate an image of the surroundings of the vehicle 100 according to the photographing result. The camera may detect the front, rear, and/or side of the vehicle 100 and may generate image data according to the detection result. For example, the camera may generate image data for other objects (e.g., other vehicles, people, objects, lanes, and obstacles) located in front, rear and/or on sides of the vehicle 100.

According to embodiments, the camera may include an image sensor, an image processor, and a camera MCU. For example, the image sensor may sense an image of a subject photographed through a lens, the image processor may receive the data from the image sensor and process the data, and the camera MCU may receive the data from the image processor.

The LIDAR sensor may detect the front, rear, and/or sides of the vehicle 100 using light or a laser and may generate detection data according to the detection result. For example, the LIDAR sensor may detect or recognize other objects (e.g., other vehicles, people, objects, lanes, and obstacles) located in front, rear and/or on sides of the vehicle 100.

According to embodiments, the LIDAR sensor may include a laser transmission module, a laser detection module, a signal collection and processing module, and a data transmission/reception module, and the light source of the laser has a wavelength within a wavelength range of 250 nm to 11 μm or the light sources of the laser, capable of tuning a wavelength, may be used. In addition, the LIDAR sensor may be classified into a time of flight (TOF) method and a phase shift method depending on a signal modulation method.

The radar sensor may detect the front, rear and/or sides of the vehicle 100 using electromagnetic waves (or radio waves) and may generate detection data according to the detection result. For example, the radar sensor may detect or recognize other objects (e.g., other vehicles, people, objects, lanes, and obstacles) located in front, rear and/or on sides of the vehicle 100.

The radar sensor may detect an object up to 150 m ahead at a horizontal angle of 30 degrees using a frequency modulation carrier wave (FMCW) or a pulse carrier method. The radar sensor may process data generated according to the detection result, and such processing may include enlarging the sensed object located in front or focusing on a region of the object within the entire region of view.

The location sensor may measure the current location of the vehicle 100. According to embodiments, the location sensor may include a GPS sensor, and the GPS sensor may measure the location, speed, and current time of the vehicle 100 using communication with a satellite. According to embodiments, the GPS sensor may measure the delay time of radio waves emitted from the satellite and obtain the location of the vehicle 100 from the distance from the orbit.

The controller 120 may control the operation of the vehicle 100 according to the control of the processor 130. According to embodiments, the controller 120 may control steering, driving, braking, and shifting of the vehicle 100. For example, the controller 120 may control each component for performing steering, driving, braking, and shifting of the vehicle 100.

The controller 120 may control the steering of the vehicle 100 according to the control of the processor 130. According to embodiments, the controller 120 may control a motor driven power steering system (MPDS) that drives the steering wheel. For example, when a vehicle collision is expected, the controller 120 may control the steering of the vehicle in a direction to avoid the collision or minimize damage.

The controller 120 may control the driving of the vehicle 100 according to the control of the processor 130. According to embodiments, the controller 120 may perform deceleration, acceleration of the vehicle 100, or turning on or off the engine. For example, the controller 120 may accelerate or decelerate according to the control of the processor 130 and may turn on/off the engine when the vehicle 100 starts or ends driving.

In addition, the controller 120 may control the driving of the vehicle 100 without the driver's control. For example, the controller 120 may perform automated driving of the vehicle 100 under the control of the processor 130.

The controller 120 may control the brake of the vehicle 100 according to the control of the processor 130. According to embodiments, the controller 120 may control whether the brake of the vehicle 100 is operated or not and control the pedal effort of the brake. For example, the controller 120 may control to automatically apply the emergency brake when a collision is expected.

The processor 130 may control the overall operation of the vehicle 100. The processor 130 may be an electrical control unit (ECU) capable of integrally controlling components in the vehicle 100. For example, the processor 130 may include a central processing unit (CPU) or micro processing unit (MCU) capable of performing arithmetic processing. For example, the processor 130 may include a central processing unit (CPU) or micro processing unit (MCU) capable of performing arithmetic processing. In addition, there may be at least one or more processors 130, and each processor 130 independently operates different functions to control the components in the vehicle 100, or according to another embodiment, the processors 130 may operate the elements of the vehicle together in an integrated manner while being in association with each other and exchanging data.

The processor 130 may perform a determination related to the control of the vehicle 100 and may control the controller 120 according to the determination result. According to embodiments, the processor 130 may receive data from the sensor 110 and generate a control command for controlling the controller 120 based on the received data. The processor 130 may transmit a control command to the controller 120. Also, the processor 130 may receive a driver's input or control and may control the controller 120 according to the driver's input.

Meanwhile, in the above description, it is explained in an assumption that the controller 120 and the processor 130 are separate components, but according to embodiments, the controller 120 and the processor 130 may be integrated as one component. For example, the controller 120 and the processor 130 may be integrated as one device and interwork with each other.

The display 140 may visually display information related to the vehicle 100. According to embodiments, the display 140 may provide various information related to the vehicle 100 to the driver of the vehicle 100 under the control of the processor 130. For example, the display 140 may visually display the current state of the vehicle 100 under the control of the processor 130.

The communication apparatus 150 may communicate with the outside of the vehicle 100. According to embodiments, the communication apparatus 150 may receive data from the outside of the vehicle 100 or transmit data to the outside of the vehicle 100 under the control of the processor 130. For example, the communication apparatus 150 may perform communication using a wireless communication protocol or a wired communication protocol.

For example, the vehicle 100 may communicate with another vehicle (vehicle to vehicle) or with an infrastructure (vehicle to infra) using the communication apparatus 150.

The memory 160 may store programmed software and various configuration information required for the processor 130 to operate. The processor 130 may operate by reading a software code from the memory 160 when the vehicle is started or the power is turned on. In addition, the processor 130 may temporarily store input data and output data generated during operation in the memory 160.

When an event such as an unexpected accident occurs while the vehicle having the conceptual organization of the vehicle as shown in FIG. 1 is performing automated driving, it is necessary for the automated drive function of the vehicle to attempt an emergency stop in order to minimize a risk of a collision with neighboring vehicles.

Embodiments of the present disclosure provide a type of an emergency stop that a vehicle traveling with the automated drive function may attempt and a device for determining a type of the emergency stop and a method thereof.

Figure 2:
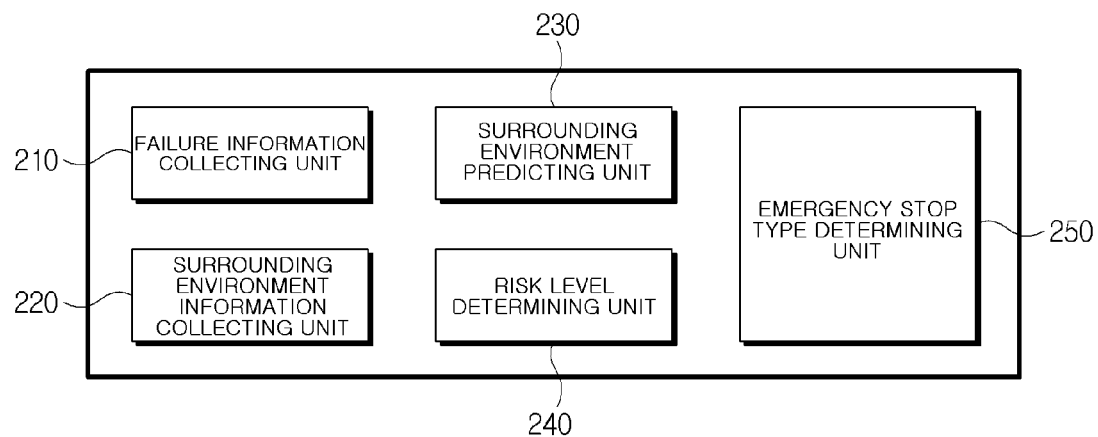
FIG. 2 shows functional blocks for determining types of an emergency stop of a vehicle.

FIG. 2 shows functional blocks for determining types of an emergency stop of a vehicle.

According to an embodiment, the functional blocks of FIG. 2 may be performed by the processor 130 of FIG. 1, but each of the functional blocks may be performed by different processors.

Referring to FIG. 2, the functional blocks for determining a type of the emergency stop for a vehicle may include a failure information collecting unit 210, a surrounding environment information collecting unit 220, a surrounding environment predicting unit 230, a risk level determining unit 240, and an emergency stop type determining unit 250. Among the units, the risk level determining unit 240 is an additional functionality and may not be included.

The failure information collecting unit 210 serves to detect performance of an automated drive function of a vehicle and collect performance states of key components of the vehicle 100 based on information collected using a sensor 110 and the like and may determine whether the vehicle 100 is in a normal state or a malfunction state. According to an embodiment, the failure information collecting unit 210 may be divided into a part collecting failure information of devices related to driving function such as transmission, engine, steering, and the like, and a part collecting failure information related to a vehicle detection function such as a camera, radar, LIDAR sensors, and the like.

The surrounding environment information collecting unit 220 may obtain neighboring vehicle information, lane information, and shoulder information detected around the vehicle 100 by integrating information obtained through a camera and a sensor attached to the vehicle, such as a radar or LIDAR sensor, a navigation device, or the communication apparatus 150.

The surrounding environment predicting unit 230 may predict a change in an environment surrounding the vehicle 100 based on information obtained from the surrounding environment information collecting unit 220 and vehicle state information obtained from the failure information collecting unit 210.

The risk level determining unit 240 may calculate a collision risk between a host vehicle and a neighboring vehicle based on state information of the neighboring vehicle obtained from the surrounding environment information collecting unit 220.

The emergency stop type determining unit 250 may select a proper type to make the vehicle 100 reach a minimal risk condition by comprehensively using information obtained from the failure information collecting unit 210, the surrounding environment predicting unit 230, and the risk level determining unit 240.

Figure 3:
FIG. 3 shows types of a final emergency stop determined by an emergency stop type determining unit according to various embodiments.

FIG. 3 shows types of a final emergency stop determined by an emergency stop type determining unit 250 according to various embodiments.

Referring to FIG. 3, the emergency stop type determining unit 250 may select one among straight-ahead stopping (type 1), in-lane stopping (type 2), half-shoulder stopping (type 3) and full-shoulder stopping (type 4) as a type of a minimal risk maneuver and may control the vehicle 100 to stop according to the corresponding type.

The straight-ahead stopping (type 1) is a type that does not drive according to the lane even if it is curved, but drives straight ahead and stops immediately, and may be feasible if only brake control is possible. That is, when the vehicle 100 is unable to change lanes or perform steering due to a breakdown or the like and only a brake can be controlled, the emergency stop type determining unit 250 may select only the straight-ahead stopping (type 1).

The in-lane stopping (type 2) is a type that performs an emergency stop while driving the vehicle 100 along a lane within a lane and may be a type that can be used only when at least brake control and steering control is possible.

The half-shoulder stopping (type 3) and the full-shoulder stopping (type 4) are the types in which the vehicle 100 changes a lane and stops on a shoulder, and there may be the full-shoulder stopping (type 4), which completely exits to the shoulder and stops on the shoulder, and the half-shoulder stopping (type 3), which stops in a way that a portion of the vehicle 100 straddles the shoulder. In order to be able to use the half-shoulder stopping (type 3) and the full-shoulder stopping (type 4), the vehicle 100 has to be capable of performing brake control and steering control, and the half-shoulder stopping (type 3) and the full-shoulder stopping (type 4) may be the types that can be used only when a lane change function and a shoulder detection function are available to use, among the automated drive functions.

According to various embodiments of the present embodiment, the emergency stop type determining unit 250 may determine a type of the emergency stop based on artificial intelligence.

Figure 4:
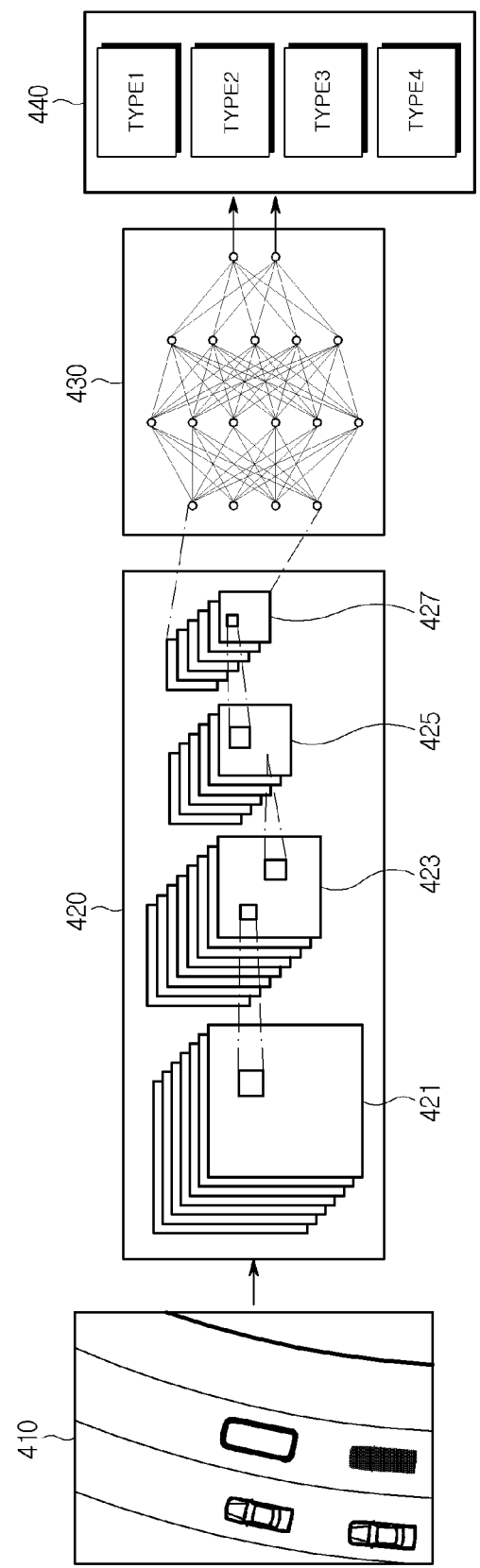
FIG. 4 is an example of artificial intelligence available for an emergency stop type determining unit to use.

FIG. 4 is an example of artificial intelligence available for an emergency stop type determining unit 250 to use.

The artificial intelligence of FIG. 4 may be implemented as a program and executed by the processor 130. In addition, the example of implementing artificial intelligence of FIG. 4 is an embodiment, and the present disclosure is not limited thereto, and artificial intelligence of a different structure or other algorithm may be used.

The artificial intelligence of FIG. 4 shows an example of artificial intelligence in the structure of a convolutional neural network (CNN), which is a kind of deep neural network. Artificial intelligence based on a convolutional neural network may be effective in identifying structural spatial data such as images, videos, and strings. Convolutional neural networks may effectively recognize features with adjacent images while maintaining spatial information of images.

Referring to FIG. 4, artificial intelligence based on a convolutional neural network may include a feature extraction layer 420 and a classification layer 430. The feature extraction layer 420 may extract features of an image 410 by synthesizing spatially nearby ones in the image 410 using convolution.

The feature extraction layer 420 may be formed of a plurality of convolutional layers 421 and 425 and pulling layers 423 and 427 stacked. The convolutional layers 421 and 425 may be the ones obtained by applying a filter to input data and then applying an activation function thereto. The convolutional layers 421 and 425 may include a plurality of channels, and each channel may be the one to which each different filter and/or different activation function is applied. A result of the convolutional layers 421 and 425 may be a feature map. The feature map may be data in two-dimensional matrix form. The pulling layers 423 and 427 may receive the output data of the convolutional layers 421 and 425, that is, a feature map as an input, and may be used to reduce the size of the output data or to emphasize specific data. The pulling layers 423 and 427 may generate output data by applying functions of a max pooling to select the largest value among some data of the output data of the convolutional layers 421 and 425, an average pooling to select an average value among some data of the output data of the convolutional layers 421 and 425, and a min pooling to select the smallest value among some data of the output data of the convolutional layers 421 and 425.

The feature maps generated through a series of the convolutional layers and the pooling layers may become smaller little by little. The final feature map generated through the last convolutional layer and pooling layer may be converted into a one-dimensional form and may be input to the classification layer 430. The classification layer 430 may be a fully connected artificial neural network structure. The number of input nodes of the classification layer 430 may be equal to a value obtained by multiplying the number of elements in the matrix of the final feature map and the number of channels.

The fully connected artificial neural network used in the classification layer 430 may include an input layer, an output layer, and selectively one or more hidden layers. Each layer may include one or more nodes corresponding to neurons of the neural network, and the artificial neural network may include synapses connecting nodes of one layer to nodes of another layer. In the artificial neural network, a node may receive input signals that are input through a synapse, and may generate an output value on the basis of an activation function with respect to a weight for each of the input signals and a bias. The output value of each node may serve as an input signal to the subsequent layer through the synapse. An artificial neural network in which all nodes of one layer are connected to all nodes of the subsequent layer through synapses may be referred to as a fully-connected artificial neural network.

The model parameter of the artificial neural network refers to a parameter determined through learning and may include a weight of a synapse connection of an artificial neural network of the classification layer 430, a bias of a neuron, and the like, and a size and kinds of filters applied in each convolutional layer 421 and 425 of the feature extraction layer 420. The hyper parameter may refer to a parameter describing the structure of artificial intelligence itself, such as the number of convolutional layers of the feature extraction layer 420 and the number of hidden layers of the classification layer 430. In addition, a hyperparameter refers to a parameter that has to be set before performing learning in a machine learning algorithm and may include a learning rate, a number of repetition times, a size of a mini-batch, an initialization function, and the like.

In addition to the above-described convolutional neural network, a recurrent neural network (RNN), a long short-term memory (LSTM) network, gated recurrent units (GRUs), or the like may be used as the deep neural network structure. The recurrent neural network is capable of performing classification and prediction by learning sequential data and is a structure that has a recurrent structure therein and learning at the past time is multiplied by a weight and a result thereof is reflected to current learning. Accordingly, the current output result is influenced by the output result from the past time, and the hidden layer performs a type of memory function. The recurrent neural network may be used for performing machine translation by analyzing speech waveforms, for generating text by understanding the components before and after the sentence of text, or for speech recognition.

An objective of performing learning for an artificial neural network is to determine a model parameter that minimizes a loss function. The loss function may be used as an index for determining an optimum model parameter in a learning process of the artificial neural network. In the case of the fully-connected artificial neural network, a weight of each synapse may be determined by learning. In the case of the convolutional neural network, a filter of the convolutional layer for extracting the feature map may be determined by learning.

Machine learning may be classified into supervised learning, unsupervised learning, and reinforcement learning according to a learning method.

Supervised learning may refer to a method of performing learning for an artificial neural network where a label related to learning data is provided, and the label may refer to a right answer (or result value) that has to be estimated by the artificial neural network when the learning data is input to the artificial neural network. Unsupervised learning may refer to a method of performing learning for an artificial neural network where a label related to learning data is not provided. Reinforcement learning may refer to a learning method performing learning so as to select, by an agent defined under a certain environment, an action or an order thereof such that an accumulated reward in each state is maximized.

The artificial intelligence illustrated in FIG. 4 uses the image 410 generated by the surrounding environment predicting unit 230 as an input and may output one type among types of the minimal risk maneuver 440 illustrated in FIG. 3 as a selected type. If the artificial intelligence determines that it is not necessary to perform an additional minimal risk maneuver, it may output an indication that the state is normal. That is, the output determined by the artificial intelligence may be information indicating a type and normal state shown in FIG. 3.

The image 410 being input into the artificial intelligence illustrated in FIG. 4 is not a simple image taken by a camera or an image sensor, but a simplified bird's eye view (SBEV) generated based on information on neighboring vehicles, lane detection, and shoulder detection that the surrounding environment predicting unit 230 obtains from the surrounding environment information collecting unit 220 and failure information of the vehicle obtained from the failure information collecting unit 210.

FIGS. 5 to 8 are views illustrating examples of images generated by the surrounding environment predicting unit 230.

Figure 5:
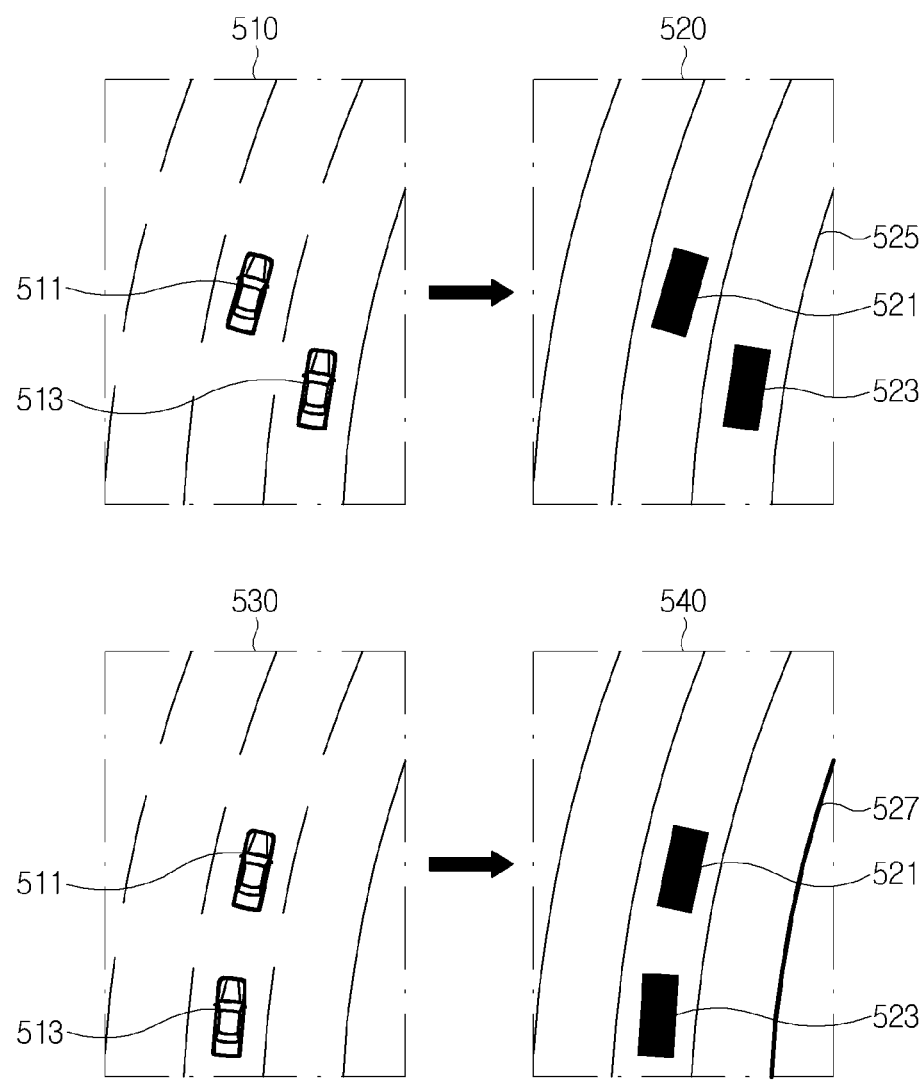
FIGS. 5 to 8 are views illustrating examples of images generated by a surrounding environment predicting unit.

In FIG. 5, the images 510 and 530 on the left are drawings simulating an actual driving situation, and the images 520 and 540 on the right may be images generated by the surrounding environment predicting unit 230 in response to each actual driving situation.

Referring to FIG. 5, the surrounding environment predicting unit 230 displays the vehicles 511 and 513 existing in the given region of interest including the host vehicle 511 as black rectangles 521 and 523, and the detected lane may be indicated with a thin solid line 525. The thin solid line 525 may be displayed with a color, e.g., as a solid green line. Further, when there is a shoulder, the lane dividing the shoulder may be indicated with a thick solid line 527, e.g., a thick black solid line. That is, when a shoulder exists, the surrounding environment predicting unit 230 may generate an image of which a shoulder may be distinguished using a thin solid line 525 and a thick solid line 527.

Figure 6:
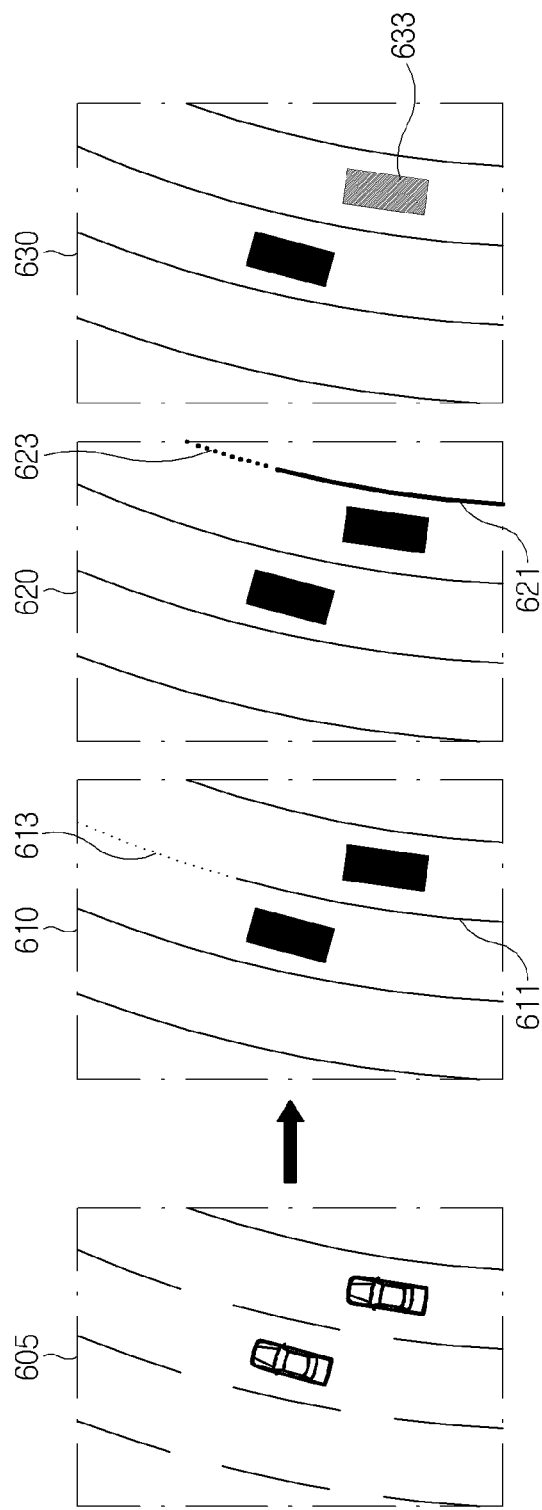

FIG. 6 is an example of an image generated by the surrounding environment predicting unit 230 in case of malfunction or abnormal operation of a peripheral recognition device.

In FIG. 6, the image 605 on the left may be a drawing simulating the actual driving situation, and the images 610, 620, and 630 on the right side may be images generated by the surrounding environment predicting unit 230 when the surrounding recognition device malfunctions or abnormally operates in response to the actual driving situation.

According to an embodiment, when a sensor or a processor that detects a neighboring vehicle or lane temporarily or permanently malfunctions or is abnormal, the sensor or the processor may fail to detect information on surrounding vehicles and fail to detect a lane. In this case, as shown in FIG. 5, information on lanes indicated with the thin solid line 525 and the thick solid line 527, and information on surrounding vehicles indicated with a black rectangle 523 may not be obtained. Then, the surrounding environment predicting unit 230 may predict the current surrounding environment using lane information or neighboring vehicle information of the past, which used to be normally recognized, and include the result in the images 610, 620, and 630.

According to the embodiment, referring to the image 610 of FIG. 6, when the surrounding environment predicting unit 230 could not obtain lane information, the surrounding environment predicting unit 230 may predict the current lane information based on the past lane information indicated with a thin solid line 611 and indicate it with a thin dotted line 613 in the image 610.

According to another embodiment, referring to the image 620 of FIG. 6, when the surrounding environment predicting unit 230 could not obtain lane information, the surrounding environment predicting unit 230 may predict the current shoulder lane information based on the shoulder lane information of the past indicated with a thick solid line 621 and indicate it with a thick dotted line 623 in the image 620.

According to still another embodiment, referring to the image 630 of FIG. 6, when the surrounding environment predicting unit 230 does not recognize the neighboring vehicle because the performance to recognize a neighboring vehicle is abnormal, the surrounding environment predicting unit 230 may predict the current location information based on the location information and state information of the vehicle of the past and include it in the image 630 as a gray rectangle 633.

Figure 7:
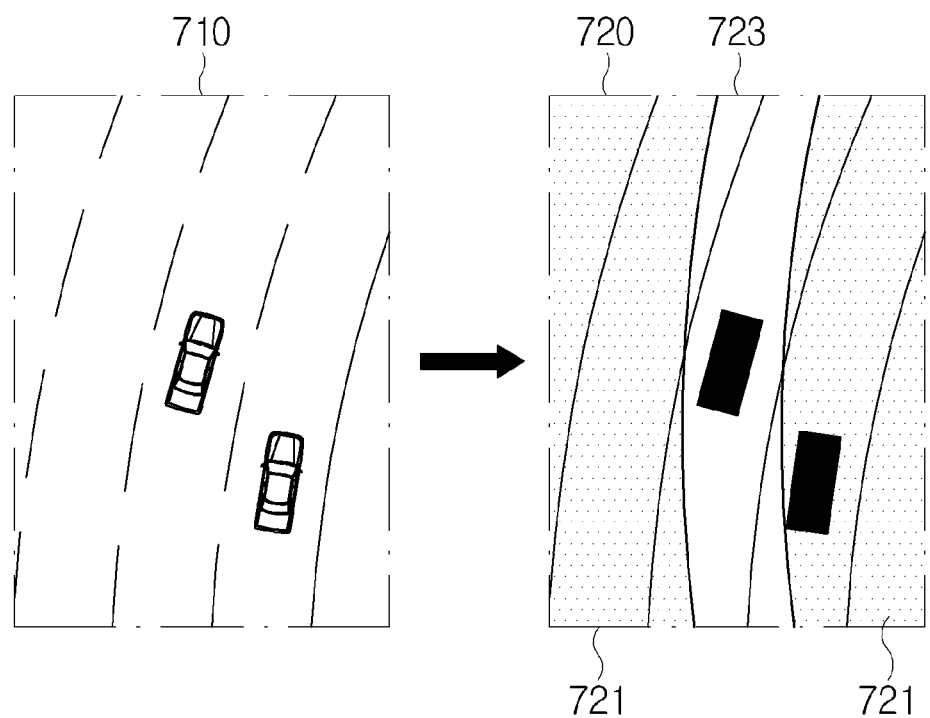

FIG. 7 illustrates an example of an image generated by the surrounding environment predicting unit 230 when lateral control of the vehicle is impossible.

In FIG. 7, an image 710 on the left side is a drawing simulating an actual driving situation, and an image 720 on the right side may be an image generated by the surrounding environment predicting unit 230 when lateral control of the vehicle is impossible.

According to an embodiment, when the processor or actuator responsible for lateral control of the vehicle is in an abnormal state, the vehicle needs to urgently stop while maintaining the current steering angle. Reflecting this, when it is impossible to change the steering angle of the vehicle, it may be possible to generate the image 720 showing a drivable area for the emergency stop. According to the embodiment, when it is determined that the lateral controller of the vehicle does not operate, the surrounding environment predicting unit 230 may generate the image 720 that indicates a drivable area 723 in which the vehicle may travel while maintaining the current steering angle with a first color (e.g., white) or a first pattern (e.g., no pattern) and that indicates a non-drivable area 721 in which the vehicle may not travel with a second color (e.g., dark gray) or a second pattern (e.g., a dot pattern). Accordingly, the surrounding environment predicting unit 230 may display the reduced drivable area 723 caused by a failure of the vehicle on the image 720. In the above embodiment, the drivable area 723 and the non-drivable area 721 are distinguished and displayed in the image by using a color or pattern, but the present disclosure is not limited thereto, and any method capable of distinguishing the drivable area 723 and the non-drivable area 721 in the image may be used.

Figure 8:
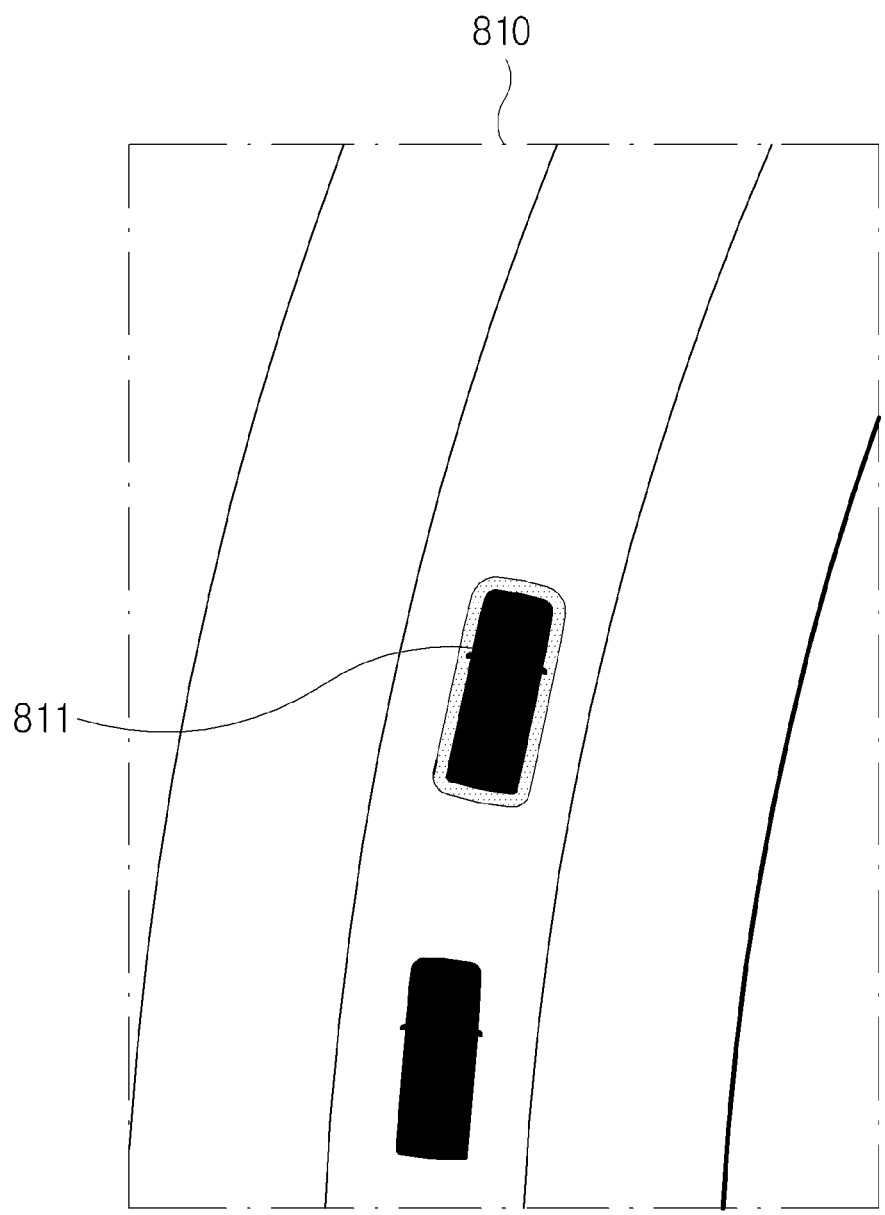

FIG. 8 illustrates an example of an image generated by the surrounding environment predicting unit 230 when driving of the host vehicle is made impossible.

Referring to FIG. 8, when the host vehicle has no problem in detecting lane information and recognizing neighboring vehicles, but is in a state where driving is not possible, due to a cause such as engine overheating, the surrounding environment predicting unit 230 may generate an image 810 that displays an exterior of a black rectangle indicating the host vehicle to be surrounded by a different color (e.g., red) or a different pattern (e.g., dot pattern) 811.

Figure 9:
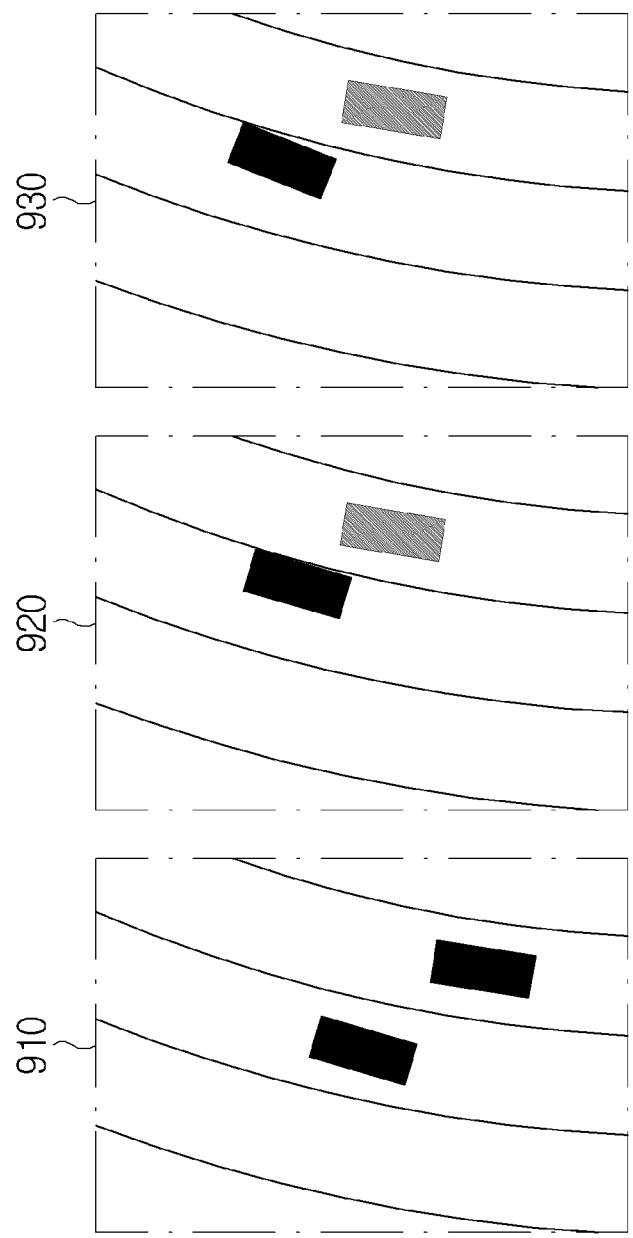
FIG. 9 is an example of an image to which risk information generated by a surrounding environment predicting unit is added.

FIG. 9 is an example of an image to which risk information generated by the surrounding environment predicting unit 230 is added.

The surrounding environment predicting unit 230 may further determine a risk of a collision between the host vehicle and the neighboring vehicle based on the driving state of the neighboring vehicle and the host vehicle. Further, as shown in FIG. 9, when the determined collision risk exceeds a predetermined value, the surrounding environment predicting unit 230 may change a color of a corresponding neighboring vehicle in generated images 920 and 930 to a different color. That is, as shown in the image 910 of FIG. 9, if the collision risk is smaller than a predetermined value, the neighboring vehicles may be displayed in black, whereas as shown in the images 920 and 930 of FIG. 9, when the collision risk is greater than the predetermined value, the neighboring vehicles may be displayed in gray. With another example, the neighboring vehicles may be displayed with different color based on the collision risk. In addition, the surrounding environment predicting unit 230 may change the brightness of the corresponding neighboring vehicle in the images 920 and 930 generated based on the determined degree of a collision risk. According to the embodiment, the surrounding environment predicting unit 230 may increase the brightness value as the collision risk increases.

Figure 10:
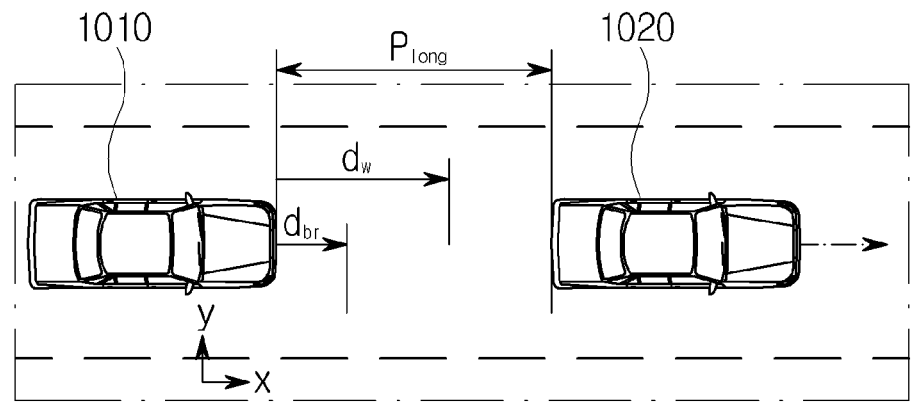
FIG. 10 is a view to explain an example of calculating a collision risk by a surrounding environment predicting unit 230.

FIG. 10 is a view to explain an example of calculating a collision risk by a surrounding environment predicting unit 230.

According to an embodiment, the risk level determining unit for calculating a level of a collision risk may be provided in the surrounding environment predicting unit 230 or an independent risk level determining unit may be provided, and the surrounding environment predicting unit 230 may obtain a result value from the risk level determining unit and use it.

Referring to FIG. 10, a level of a collision risk between a front vehicle 1020 and a rear vehicle 1010 may be calculated. Here, the host vehicle may be the front vehicle 1020 or the rear vehicle 1010.

First, it is possible to calculate a time to collision (TTC) using the following Equation 1.

$$TTC = \frac{P_{long}}{v_{rel}} \qquad \text{Equation 1}$$

Here, $P_{long}$ may represent the longitudinal distance between the rear vehicle 1010 and the front vehicle 1020 as shown in FIG. 10, and $v_{rel}$ may represent the longitudinal relative velocity between the rear vehicle 1010 and the front vehicle 1020. Since collision risk calculation is performed by the host vehicle, $v_{rel}$ may represent the longitudinal relative velocity of the neighboring vehicles with respect to the host vehicle.

In addition, a warning index (xp) may be calculated by using Equation 2.

$$x_p = \frac{P_{long} - d_{br}}{d_w - d_{br}} \qquad \text{Equation 2}$$

As shown in FIG. 10, $P_{long}$ represents the longitudinal distance between the rear vehicle 1010 and the front vehicle 1020, and $d_{br}$ represents a breaking-critical distance until the vehicle stops when the vehicle moves with constant acceleration at maximum deceleration, and $d_w$ is a warning-critical distance considering the reaction time that it takes until the driver steps on a brake in $d_{br}$.

$d_{br}$ may be calculated using the following Equation 3, and $d_w$ may be calculated using the following Equation 4.

$$d_{br} = v_{rel} \cdot t_{brake} - \frac{v_{rel}^2}{2a_{x,max}} \quad \text{Equation 3}$$

$$d_w = v_{rel} \cdot t_{thinking} + v_{rel} \cdot t_{brake} - \frac{v_{rel}^2}{2a_{x,max}} \quad \text{Equation 4}$$

Here, $v_{rel}$ represents the longitudinal relative velocity between the rear vehicle 1010 and the front vehicle 1020, $t_{brake}$ is the system delay time of a hardware of the braking system, $t_{thinking}$ is the reaction time that it takes until the driver steps on the brake and $a_{x,max}$ represents the maximum longitudinal deceleration of the vehicle.

When the driver of the rear vehicle 1010 applies the brake and the rear vehicle 1010 decelerates to the maximum, the rear vehicle 1010 may go by $d_w$, and if $d_w$ is less than $P_{long}$, the warning index $x_p$ has a positive value and it may be determined that the current situation is safe. To the contrary, if $d_w$ is greater than $P_{long}$, the warning index ($x_p$) has a negative value and it may be determined that there is a probability of a collision.

The surrounding environment predicting unit 230 may calculate a longitudinal collision risk index ($I_{long}$) based on the following Equation 5.

$$I_{long} = \max\left(\frac{|x_{max} - x_p|}{|x_{max} - x_{th}|}, \frac{|TTC^{-1}|}{|TTC_{th}^{-1}|}\right) \quad \text{Equation 5}$$

Here, $x_{max}$ is the maximum value of the warning index, $x_{th}$ is a threshold value of the warning index, and $TTC_{th}^{-1}$ is a threshold value of $TTC^{-1}$.

The time to lane crossing (TLC) in case the host vehicle changes a lane may be calculated using the following Equation 6.

$$TLC = \frac{y}{v_y} \quad \text{Equation 6}$$

Here, y represents the lateral relative position of the neighboring vehicle, and $v_y$ represents the lateral relative velocity between the rear vehicle 1010 and the front vehicle 1020.

In addition, the surrounding environment predicting unit 230 may calculate a lateral collision risk index ($I_{lat}$) by using Equation 7.

$$I_{lat} = \min(I_{long}, 1) \cdot \min\left(\frac{TLC_{th}}{TLC}, 1\right) \quad \text{Equation 7}$$

Here, $TLC_{th}$ may be a threshold value of a predetermined lane change time.

The lateral collision risk index has a value between 0 and 1, and the closer to 1, the more dangerous the current situation may be.

According to an embodiment, the threshold values included in the above equations may be set based on collision accident data or may be set based on a result of virtual accident data generated through a simulation test. According to an embodiment, $TTC_{th}^{-1}$ and $TLC_{th}$ may be 0.5.

The surrounding environment predicting unit 230 may generate an image with different brightness depending on the collision risk index as shown in FIG. 9, by reflecting the longitudinal collision risk index and/or the lateral collision risk index obtained based on the above-described equation.

The vehicle 100 of embodiments of the present disclosure may support automated driving. According to embodiments, the vehicle 100 may perform steering, accelerating, braking, shifting, or parking without a driver's intervention and may drive under control of the driver when the driver intervenes. The vehicle 100 may perform various functions related to automated driving to support the automated driving, and in particular, the vehicle 100 may perform the minimal risk maneuver (MRM) based on the functions mentioned above.

Figure 11:
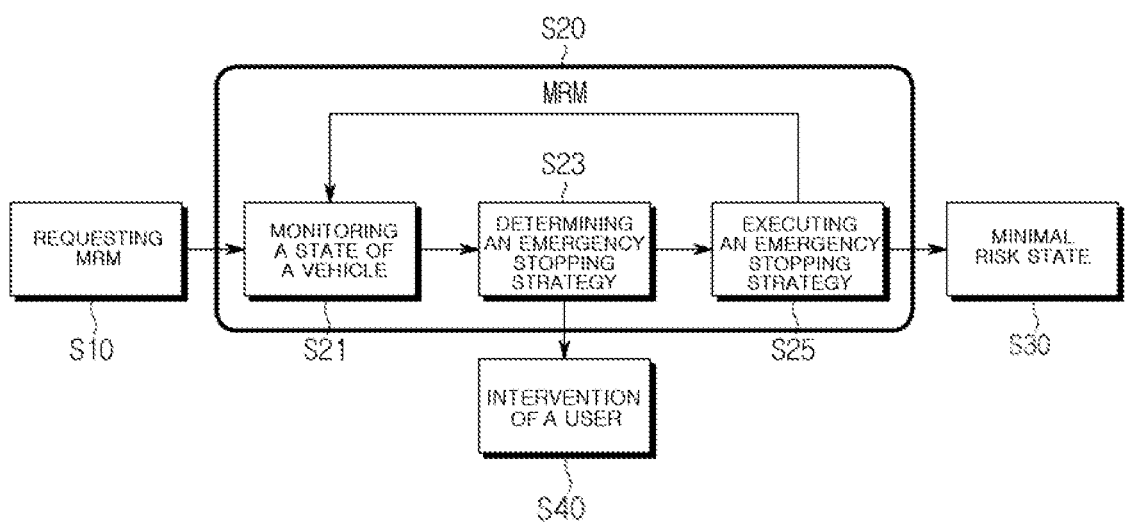
FIG. 11 is a flowchart showing operations required for performing a minimal risk maneuver of a vehicle according to various embodiments.

FIG. 11 is a flowchart showing operations required for performing a minimal risk maneuver of a vehicle according to various embodiments.

Referring to FIG. 11, in a step S10, the vehicle 100 may obtain a request for starting the minimal risk maneuver (MRM). According to embodiments, the processor 130 may generate a request for starting the minimal risk maneuver function when the vehicle 100 is started and the vehicle 100 starts traveling at a certain speed or more. Alternatively, the processor 130 may obtain information on the vehicle 100 and a state around the vehicle 100 and generate a request for the minimal risk maneuver based on the obtained state information. Alternatively, the processor 130 may obtain a request for the minimal risk maneuver from the outside received through the communication apparatus 150 or the sensor 110. The request for the minimal risk maneuver may mean an arbitrary command that causes the vehicle 100 to perform the minimal risk maneuver.

In a step S20, the vehicle 100 may execute the minimal risk maneuver function when there is a request for the minimal risk maneuver.

The minimal risk maneuver function may include a step of monitoring the state of the vehicle, a step of determining a type of the minimal risk maneuver, and a step of executing the minimal risk maneuver according to the determined type of the minimal risk maneuver.

In a step S21, the vehicle 100 may monitor the state of the vehicle 100. According to embodiments, the vehicle 100 may monitor state information on components of the vehicle 100 and surrounding environment information of the vehicle 100 by using the failure information collecting unit 210 and the surrounding environment information collecting unit 220. The vehicle 100 may monitor the state of each of the components of the vehicle 100 and the surrounding environment information that the vehicle 100 deals with, for example, lanes, neighboring vehicle information, and the like in real time. The vehicle 100 may determine a sensor or component available to use (or that is operable) at the moment, among the sensors 110.

In a step S23, the vehicle 100 may determine a type of the emergency stop of the vehicle based on the monitored information. According to various embodiments, the types of the emergency stop of the vehicle may include the straight-ahead stopping, in-lane stopping, half-shoulder stopping, and full-shoulder stopping. However, the types are not limited thereto, and another embodiment may include an additional emergency stop type.

The vehicle 100 may determine a type of the emergency stop that is appropriate to the current failure state based on the result of determining a failure state. According to an embodiment, the straight-ahead stopping may be selected as a feasible type when only the brake control of the vehicle is available. According to another embodiment, the in-lane stopping type may be selected in addition to the straight-ahead stopping, when the steering control and the brake control of the vehicle are available. According to another embodiment, the half-shoulder stopping and the full-shoulder stopping may be selected when a lane change function and a shoulder detection function are available to perform among the automated drive functions in addition to the steering control and the brake control.

According to various embodiments of the present disclosure, the vehicle 100 may determine the emergency stopping type based on artificial intelligence.

Figure 12:
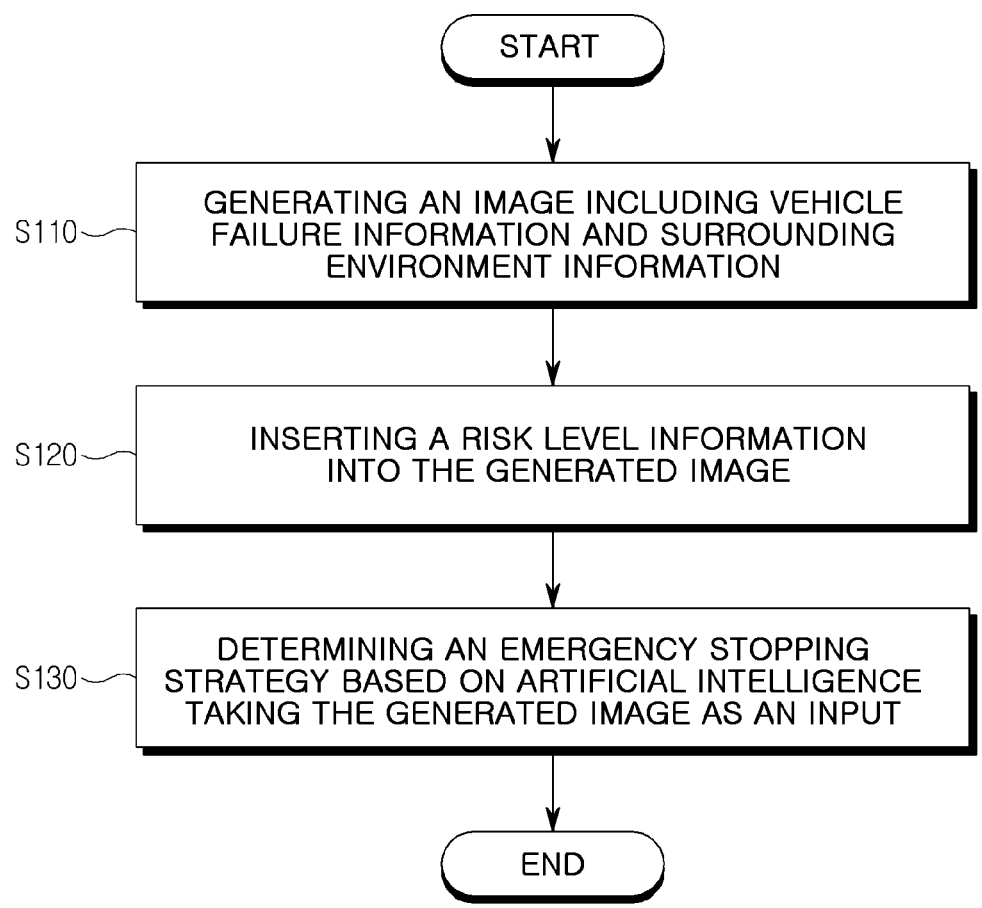
FIG. 12 is a flowchart showing determination of a type of an emergency stop based on artificial intelligence by a vehicle.

FIG. 12 is a flowchart showing determination of a type of an emergency stop based on artificial intelligence by a vehicle.

Referring to FIG. 12, in a step S110, it is possible to generate an image that includes the collected state information or failure information and the surrounding environment information of the vehicle.

In a step S120, it is possible to additionally insert information of a level of a collision risk in an image generated in the step of S110, however, the insertion is an auxiliary step and thus, the step S120 may not perform the insertion.

In a step S130, it is possible to determine the type of the emergency stop based on artificial intelligence that takes the generated image as an input. Here, the artificial intelligence may be learned artificial intelligence according to a supervised learning method based on images generated in the step S110 or S120. That is, the artificial intelligence provided in the vehicle may be the artificial intelligence learned by a manufacturer before being mounted on the vehicle. Therefore, the vehicle 100 may determine a type of the emergency stop based on an image input using the pre-learned artificial intelligence.

Figure 13:
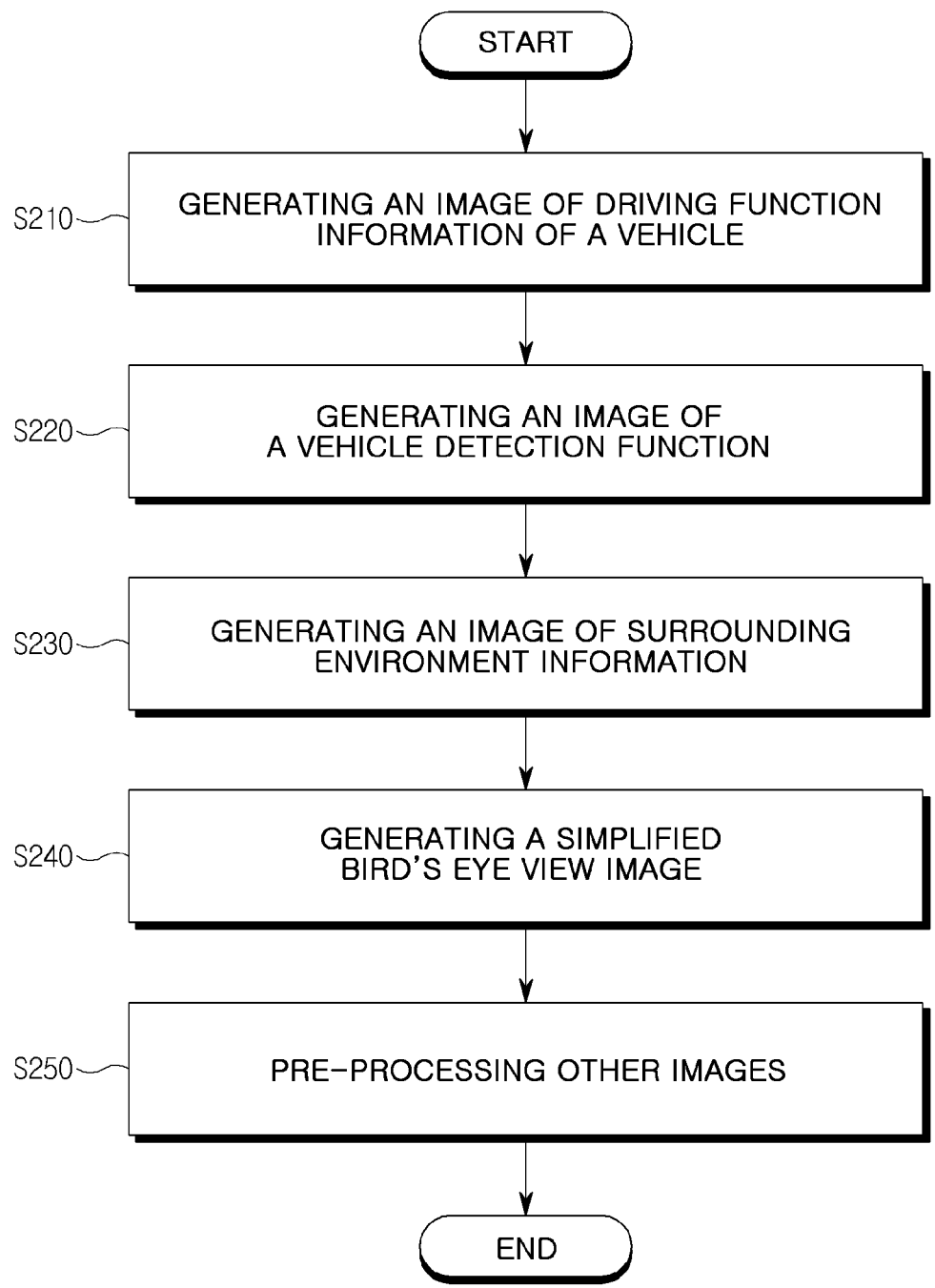
FIG. 13 is a flowchart showing an example of generating an image which includes collected state information, failure information, and surrounding environment information of a vehicle.

FIG. 13 is a flowchart showing an example of generating a simplified bird's eye view image being input to the artificial intelligence based on collected state information, failure information, and surrounding environment information of a vehicle.

The flowchart of FIG. 13 may represent detailed steps of the step S110 of FIG. 12.

A size of the simplified bird's eye view image may be set before generating a simplified bird's eye view (SBEV) image according to FIG. 13. The set size of the image may be the same for both the images being input for determination of the learned artificial intelligence and the images for the purpose of teaching the artificial intelligence. According to an embodiment, the size of the simplified bird's eye view may be set to 3HW. Here, H represents a height of the image, W represents a width of the image and 3 represents that there are three images, R, G, and B. Further, units of the height and width may be pixels. Also, it is possible to set a distance between pixels to X(m) in order to map it with an actual physical meaning.

Referring to FIG. 13, in a step S210, the vehicle 100 may generate an image related to driving function information of the vehicle based on failure information of vehicle components such as the transmission, engine, steering, and the like. For example, it is possible to set the drivable area that the vehicle 100 may travel on at the current steering angle by reflecting failure of steering of the vehicle 100 and express the drivable area in the simplified bird's eye view based on the set size of the image and the distance between pixels.

In a step S220, the vehicle 100 may generate an image related to the information on the vehicle detection function based on the information collected by the components having the vehicle detection function such as a camera, radar, LIDAR sensor, and the like. For example, the vehicle 100 may express its trace of wheels and location of the past in the simplified bird's eye view image.

In a step S230, the vehicle 100 may generate an image of the current surrounding environment information based on the information obtained from the surrounding environment information collecting unit 220 and the surrounding environment predicting unit 230. For example, the vehicle 100 may express traffic information, shoulder information, safety zone indication, and the like in the image. Further, the vehicle 100 may display a lane recognized by the surrounding environment information collecting unit 220 as a solid line and display a lane predicted by the surrounding environment predicting unit 230 due to being unable to recognize a lane as a dotted line.

In a step S240, the vehicle 100 may generate the simplified bird's eye view image. The vehicle 100 may generate the simplified bird's eye view image by synthesizing images generated in steps S210 to S230. At this time, the simplified bird's eye view image is configured to include information as much as possible in a simple form such as displaying the host vehicle and the detected neighboring vehicle as rectangles and a lane as a solid line or a dotted line. According to an embodiment, the vehicle 100 does not execute the step S230 separately and adds simplified images drawn in each step to the set size of the image while executing steps S210 to S230 sequentially or in parallel, thereby the simplified bird's eye view image may be obtained.

In a step S250, the vehicle 100 may generate a final image that is input to the artificial intelligence by performing other pre-processing operations for the image, if necessary.

In the embodiment of FIG. 13, steps S210 to S230 are not performed in a certain order, but may be performed in an order different from the order illustrated in FIG. 13, and the corresponding operations may be simultaneously performed according to another embodiment.

The final image generated according to the step S110 may be the images of FIGS. 5 to 8.

The final image generated by performing the step S120 additionally may be the image of FIG. 9.

Referring back to FIG. 11, in the step S25, the determined type of the emergency stop may be executed.

In order to execute the determined type of the emergency stop, the vehicle 100 may execute at least one selected among stopping the vehicle, controlling steering of the vehicle, keeping the lane, providing visual, audible and tactile notifications, decelerating the vehicle, accelerating the vehicle, initiating/ending an automated drive, turning off the vehicle's ignition, transmitting an emergency signal, controlling an emergency light, warning a speed reduction, controlling a brake light, transferring control authority to another passenger, and remote control. For example, the processor 130 of the vehicle 100 may transmit a control command corresponding to the determined type of the emergency stop to the controller 120, and the controller 120 may control the vehicle 100 according to the control command.

After the type of the emergency stop determined in the step S25 is executed, the vehicle is stopped and may be in the minimal risk state in step S30. When the vehicle 100 reaches the minimal risk state in step S30, the automated drive system may be turned off or the vehicle 100 may be turned off.

In addition, during the step S20, the vehicle 100 may allow an intervention of a user in step S40. Thus, when an intervention of a user is occurred, the vehicle 100 may stop the minimal risk maneuver function and the user takes over a manipulation of the vehicle 100.

What is claimed is:

1. A method for operating a vehicle, the method comprising:
   monitoring a state of the vehicle, wherein the state of the vehicle comprises state information of components of the vehicle and surrounding environment information of the vehicle;
   generating a first image comprising driving function information of the vehicle;
   generating a second image comprising detection function information of the vehicle;
   generating a third image comprising the surrounding environment information of the vehicle;
   generating a simplified bird's eye view image by synthesizing the generated first image, the generated second image, and the generated third image;
   determining a type of an emergency stop from a plurality of types of emergency stops based on the state of the vehicle using artificial intelligence that takes the generated simplified bird's eye view image as an input; and
   executing the determined type of the emergency stop.

2. The method of claim 1, further comprising obtaining a request to execute a minimal risk maneuver function, wherein monitoring the state of the vehicle, determining the type of the emergency stop, and executing the determined type of the emergency stop are initiated only after the request is obtained.

3. The method of claim 1, further comprising:
   determining whether the vehicle has completed executing the determined type of the emergency stop and has reached a minimal risk state; and
   in response to a determination that the vehicle has reached the minimal risk state, turning off an automated drive system.

4. The method of claim 1, wherein the plurality of types of emergency stops comprises:
   straight-ahead stopping in which the vehicle is stopped after driving straight ahead;
   in-lane stopping in which the vehicle stops while driving along a lane;
   half-shoulder stopping in which the vehicle stops partially on a shoulder after the shoulder is recognized; and
   full-shoulder stopping in which the vehicle completely turns to and stops on the shoulder after the shoulder is recognized.

5. The method of claim 4, wherein determining the type of the emergency stop comprises:
   determining the straight-ahead stopping in response to control of a brake of the vehicle being available and control of steering of the vehicle, control of a lane change, and control of shoulder detection being unavailable;
   determining the in-lane stopping in response to the control of the brake and the control of the steering being available and the control of the lane change and the control of the shoulder detection being unavailable; and
   determining the half-shoulder stopping or the full-shoulder stopping in response to the control of the brake, the control of the steering, the control of the lane change, and the control of the shoulder detection being available.

6. The method of claim 4, wherein generating the first image comprises generating the first image that displays a drivable area and a non-drivable area in different colors or different patterns based on a current steering angle of the vehicle in response to changing of the current steering angle of the vehicle not being possible.

7. The method of claim 4, wherein generating the second image comprises generating the second image that displays the lane and the shoulder in different colors or different patterns.

8. The method of claim 4, wherein generating the second image comprises:
   predicting current lane information based on detected lane information identified previously; and
   in response to failing to detect the lane, generating the second image that displays the detected lane information and the predicted current lane information in different colors or different patterns.

9. The method of claim 1, wherein the method further comprises:
   calculating a risk of a collision with a neighboring vehicle; and
   displaying and changing a brightness of the neighboring vehicle in the simplified bird's eye view image based on the collision risk to indicate the collision risk.

10. A vehicle comprising:
    sensors;
    a processor configured to control automated driving of the vehicle based on state information of components of the vehicle and surrounding environment information of the vehicle detected by the sensors; and
    a controller configured to control an operation of the vehicle by the processor, wherein the processor is further configured to:
    monitor a state of the vehicle;
    obtain the state information of the components of the vehicle and the surrounding environment information of the vehicle;
    generate a first image comprising driving function information of the vehicle;
    generate a second image comprising detection function information of the vehicle;
    generate a third image comprising the surrounding environment information of the vehicle;
    generate a simplified bird's eye view image by synthesizing the generated first image, the generated second image, and the generated third image;
    determine a type of an emergency stop from a plurality of types of emergency stops based on the state of the vehicle using artificial intelligence that takes the generated simplified bird's eye view image as an input; and
    execute the determined type of the emergency stop by the controller.

11. The vehicle of claim 10, wherein the processor is configured to obtain a request to execute a minimal risk maneuver function, and wherein the processor is configured to determine the type of the emergency stop and execute the determined type of the emergency stop in response to the request to execute.

12. The vehicle of claim 10, wherein, after the vehicle is in a minimal risk state, the processor is configured to complete the executed type of the emergency stop and turn off an automated drive system.

13. The vehicle of claim 10, wherein, to monitor the state of the vehicle, the processor is configured to:
- obtain failure information related to a driving function of the vehicle;
- obtain failure information related to a detection function of the vehicle; and
- obtain the surrounding environment information of the vehicle.

14. The vehicle of claim 13, wherein the plurality of types of emergency stops comprises:
- straight-ahead stopping in which the vehicle stops after driving straight ahead;
- in-lane stopping in which the vehicle stops while driving along a lane;
- half-shoulder stopping in which the vehicle stops partially on a shoulder after the shoulder is recognized; and
- full-shoulder stopping in which the vehicle completely turns to and stops on the shoulder after the shoulder is recognized.

15. The vehicle of claim 14, wherein the processor is configured to:
- determine the straight-ahead stopping as the determined type of emergency stop based on control of a brake of the vehicle being available and control of steering of the vehicle, control of a lane change, and control of shoulder detection being unavailable;
- determine the in-lane stopping as the determined type of emergency stop based on the control of the brake and the control of the steering being available and the control of the lane change and the control of the shoulder detection being unavailable; and
- determine the half-shoulder stopping or the full-shoulder stopping as the determined type of emergency stop based on the control of the brake, the control of the steering, the control of the lane change, and the control of the shoulder detection being available.

16. The vehicle of claim 10, wherein in the first image, in response to control of a steering angle of the vehicle not being possible, the processor is configured to display a drivable area and a non-drivable area in different colors or different patterns based on a current steering angle of the vehicle.

17. The vehicle of claim 10, wherein in the second image, the processor is configured to display a lane and a shoulder in different colors or different patterns.

18. The vehicle of claim 10, wherein, in response to a failure in detecting a lane, in generating the second image, the processor is configured to:
- predict current lane information based on detected lane information identified previously; and
- generate the second image that displays the detected lane information and the predicted current lane information in different colors or different patterns.

19. The vehicle of claim 10, wherein the processor is configured to:
- calculate a risk of a collision with a neighboring vehicle; and
- display and change a brightness of the neighboring vehicle included in the simplified bird's eye view image based on the collision risk to indicate the collision risk.

20. A vehicle comprising:
- sensors;
- a processor configured to control automated driving of the vehicle based on state information of components of the vehicle and surrounding environment information of the vehicle detected by the sensors; and
- a controller configured to control an operation of the vehicle by the processor, wherein the processor is further configured to:
  - monitor a state of the vehicle;
  - obtain the state information of the components of the vehicle and the surrounding environment information of the vehicle;
  - generate a simplified bird's eye view image comprising portions of the state information of the components of the vehicle and the surrounding environment information of the vehicle by synthesizing a first image comprising driving function information of the vehicle, a second image comprising detection function information of the vehicle, and a third image comprising the surrounding environment information of the vehicle;
  - determine a type of an emergency stop from a plurality of types of emergency stops based on the state of the vehicle using artificial intelligence that takes the generated simplified bird's eye view image as an input;
  - execute the determined type of the emergency stop by the controller; and
  - after the vehicle is in a minimal risk state, complete the executed type of the emergency stop and turn off an automated drive system.

21. The vehicle of claim 20, wherein in the first image, in response to control of a steering angle of the vehicle not being possible, the processor is configured to display a drivable area and a non-drivable area in different colors or different patterns based on a current steering angle of the vehicle.

22. The vehicle of claim 20, wherein in the second image, the processor is configured to display a lane and a shoulder in different colors or different patterns.

23. The vehicle of claim 20, wherein, in response to a failure in detecting a lane, in generating the second image, the processor is configured to:
- predict current lane information based on detected lane information identified previously; and
- generate the second image that displays the detected lane information and the predicted current lane information in different colors or different patterns.

24. The vehicle of claim 20, wherein the processor is configured to:
- calculate a risk of a collision with a neighboring vehicle; and
- display and change a brightness of the neighboring vehicle included in the simplified bird's eye view image based on the collision risk to indicate the collision risk.

* * * * *